(12) United States Patent
Picard et al.

(10) Patent No.: US 11,417,893 B2
(45) Date of Patent: Aug. 16, 2022

(54) METHOD FOR RECYCLING USED OR DISCARDED PORTABLE ELECTRIC BATTERIES

(71) Applicants: FIDAY GESTION, Chassey-les-Scey (FR); ECO'RING, Feurs (FR)

(72) Inventors: Lionel Picard, Feurs (FR); Jean-Pierre Garnier, Pennessieres (FR)

(73) Assignees: FIDAY GESTION, Chassey-les-Scey (FR); ECO'RING, Feurs (FR)

( * ) Notice: Subject to any disclaimer, the term of this patent is extended or adjusted under 35 U.S.C. 154(b) by 166 days.

(21) Appl. No.: 15/102,558

(22) PCT Filed: Dec. 10, 2013

(86) PCT No.: PCT/FR2013/053012
§ 371 (c)(1),
(2) Date: Jun. 8, 2016

(87) PCT Pub. No.: WO2015/086914
PCT Pub. Date: Jun. 18, 2015

(65) Prior Publication Data
US 2016/0315330 A1 Oct. 27, 2016

(51) Int. Cl.
*H01M 6/52* (2006.01)
*C22B 7/00* (2006.01)
(Continued)

(52) U.S. Cl.
CPC ............. *H01M 6/52* (2013.01); *B09B 3/40* (2022.01); *B09B 5/00* (2013.01); *C21C 1/08* (2013.01);
(Continued)

(58) Field of Classification Search
CPC .......... C21C 1/08; C21C 7/0006; H01M 6/52; Y02W 30/84; Y02W 30/54;
(Continued)

(56) References Cited

U.S. PATENT DOCUMENTS

| 4,340,421 | A | * | 7/1982 | Bergsoe | ................. | C22B 7/003 |
|---|---|---|---|---|---|---|
| | | | | | | 429/49 |
| 7,776,298 | B2 | * | 8/2010 | Herden | .................. | B01D 53/12 |
| | | | | | | 423/240 R |

(Continued)

FOREIGN PATENT DOCUMENTS

| CN | 102569838 A | 7/2012 |
|---|---|---|
| JP | 60255190 A * | 12/1985 |

(Continued)

OTHER PUBLICATIONS

JP S60255190A machine translation. (Year: 1985).*
(Continued)

*Primary Examiner* — Scott R Kastler
(74) *Attorney, Agent, or Firm* — Cantor Colburn LLP

(57) ABSTRACT

A method for upgrading used or rejected electric battery cells, which include upgradable compounds, such as iron, zinc, manganese, copper, and fixed and volatile carbon, and heavy metals and dangerous compounds. The used or rejected battery cells are introduced as a load into a furnace for melting metal, such as a cupola furnace, a free arc furnace, or an induction furnace. A device for purifying gases produced by the furnace and for capturing and removing noxious elements, such as mercury, chlorides, and fluorides, and heavy molecules such as dioxins, furans, and aromatic substances, is provided in a discharge route of the hot gases, downstream from the melting furnace.

8 Claims, 3 Drawing Sheets

(51) Int. Cl.
| | |
|---|---|
| *B09B 3/00* | (2006.01) |
| *C22C 37/00* | (2006.01) |
| *C22C 33/04* | (2006.01) |
| *C22C 1/02* | (2006.01) |
| *C22C 33/08* | (2006.01) |
| *C21C 7/00* | (2006.01) |
| *C21C 1/08* | (2006.01) |
| *B09B 5/00* | (2006.01) |
| *F27D 17/00* | (2006.01) |
| *B09B 3/40* | (2022.01) |
| *B01D 53/04* | (2006.01) |

(52) U.S. Cl.
CPC ............ *C21C 7/0006* (2013.01); *C22B 7/001* (2013.01); *C22B 7/003* (2013.01); *C22C 1/02* (2013.01); *C22C 33/04* (2013.01); *C22C 33/08* (2013.01); *C22C 37/00* (2013.01); *F27D 17/003* (2013.01); *F27D 17/008* (2013.01); *B01D 53/04* (2013.01); *B01D 2253/102* (2013.01); *B01D 2257/2064* (2013.01); *B01D 2257/602* (2013.01); *C21C 2250/00* (2013.01); *H01M 2220/30* (2013.01); *Y02P 10/20* (2015.11); *Y02P 10/25* (2015.11); *Y02W 30/50* (2015.05); *Y02W 30/82* (2015.05); *Y02W 30/84* (2015.05)

(58) Field of Classification Search
CPC ...... Y02W 30/821; B09B 3/0083; C22C 1/02; C22C 33/04; C22C 33/08; C22C 37/00; C22B 7/001
See application file for complete search history.

(56) References Cited

U.S. PATENT DOCUMENTS

| | | | |
|---|---|---|---|
| 9,212,406 B2* | 12/2015 | Takahashi | ............... C22B 1/005 |
| 2008/0271566 A1* | 11/2008 | Clark | ....................... C22B 1/243 |
| | | | 75/252 |
| 2014/0069234 A1 | 3/2014 | Takahashi et al. | |

FOREIGN PATENT DOCUMENTS

| | | | | |
|---|---|---|---|---|
| JP | 10-118613 A | 5/1998 | | |
| JP | 11-57373 A | 3/1999 | | |
| TW | 384236 B | 3/2000 | | |
| WO | WO-2012111693 A1 * | 8/2012 | ............. | C22B 1/005 |

OTHER PUBLICATIONS

Watson, Neil. "Primary Battery Recycling in Europe" in Used Battery Collection and Recycling by G. Pistoia, J.-P. Wiaux and S.P. Wolsky (Eds). Elsevier Science B.V. pp. 177-223. (Year: 2001).*
CN 102569838 machine translation of the description (Year: 2012).*
KR 100567705 machine translation of the description and family data (Year: 2006).*
Burri et al.; "The Wimmis project", *J. of Power Sources*, vol. 57, No. 1, Elsevier SA, CH, pp. 31-35, (Sep. 12, 1995).
Bernades et al., "Recycling of batteries; a review of current processes and technologies", *J. of Power Sources*, Elsevier SA, CH, vol. 130, No. 1-2, pp. 291-298, (May 3, 2008).
European Patent Office; Search Report in International Patent Application No. PCT/FR2013/053012, (dated Aug. 12, 2014).

* cited by examiner

METHOD FOR RECYCLING USED OR DISCARDED PORTABLE ELECTRIC BATTERIES

FIELD OF THE INVENTION

The invention relates to a method for upgrading portable used or rejected electric battery cells, such as saline, alkaline, small size button cells, which include upgradable components such as iron, zinc, manganese, carbon, copper and heavy metals and dangerous organic/organo-metal compounds such as mercury, nickel, lead, silver, pitch, chlorides or even fluorides.

The invention also relates to a system for carrying out this method.

BACKGROUND

It is known that portable used battery cells pose a considerable environmental problem since they are a waste, and, according to decree number 2012-617, as of Feb. 5, 2012, from the European Directive 2006/66 EC, it is mandatory to upgrade them instead of rejecting them or incinerating them, with a minimum recycling rate of 50%. The amount put on the market yearly may be evaluated at 30,000 metric tons in France and about 200,000 metric tons in the European Union.

A method for upgrading materials contained in battery cells is already known a so-called method via a pyrometallurgical route, by means of an electric furnace with a free arc, which allows recovery of certain metal elements contained in the battery cells by concomitant production of an ingot metal of the ferro-manganese-nickel-copper type, of a silico-calcium slag rich in manganese typically from 15 to 40%, and of a fusion dust rich in Zn typically more than 50% of contained Zn.

Another known method, a so-called method via a mechanical route consisting of milling the battery cells, and then separating the ferrous fractions via a magnetic route as shavings and the non-deviated fraction for subsequent upgrading. In the latter case, the recovered elements in the non-deviated fraction are in a powdery form and sufficiently pasty releasing a strong smell of ammonia because of the mixtures of electrolytes of alkaline and saline battery cells, which may make their subsequent use more difficult to apply.

These upgrading methods require an investment of significant capital. Further, the products from the upgrading are not used in situ, and have to be conditioned, and then resold to external users, which leads to additional logistic and packaging costs as well as to rejections of gases with a high greenhouse effect.

But especially, these methods do not always allow solving the problem posed by noxious elements contained in the battery cells, such as mercury, manganese di-oxide, compounds of metal nickel and oxides-hydroxides, lead, silver, pitch, chlorides or even fluorides as well as very powerful well known dioxin catalysts, such as metal oxide-hydroxide fines (case of contained manganese), chlorides (case of zinc chloride) and contained carbon fines (either as graphite or organic carbon such as pitch) in a hot recycling branch.

SUMMARY OF THE INVENTION

The object of the invention is to propose a method and a system for carrying out this method, which overcome the drawbacks which have just been listed.

In order to attain this goal, the method according to the invention is characterized in that used battery cells are introduced as a load into a melting furnace for producing cast iron such as a cupola furnace, an arc furnace or an induction furnace, so as to upgrade most metal and carbonaceous elements directly from the battery cell to the produced cast iron and in that a device for purifying gases for capturing and upgrading zinc in a separative way, capturing the noxious elements, such as mercury and neutralizing the perverse mechanisms of formation of dioxins and furans is provided in the duct for discharging hot gases downstream from the melting furnace.

According to a feature of the invention, the method is characterized in that a melting furnace is used such as a cupola furnace, a free arc furnace, an induction furnace for producing metal of the cast iron type and containing manganese loaded in the cupola furnace with scrap iron and other loading components, and an amount of used or rejected battery cells is introduced with the loads into the melting furnace so that the amount of manganese contained in these battery cells corresponds to the amount of manganese which has to be introduced into the melting furnace in addition to the manganese contained in the scrap iron for obtaining the required manganese content for the relevant cast iron grade.

According to another feature of the invention, the method is characterized in that the consumption of new raw materials is advantageously reduced, such as iron, carbon, copper in the loads depending on the amount of each of them contained in the used or rejected battery cells.

Further according to another feature of the invention, the method is characterized in that the hot fumes leaving the melting furnace are subject to filtration operations for reducing the concentration of the dusts contained in the fumes to a value of less than 0.5 mg/Nm$^3$ and for then letting through the fumes through a bed of active coal either sulfurized or not for binding the mercury and the heavy molecules such as dioxins, furans and aromatic substances so that the fumes discharged into the atmosphere have a mercury content of less than 2 µg/Nm$^3$ and of dioxins of less than 0.1 ng/Nm$^3$.

According to still another feature of the invention, the method is characterized in that during filtration operations zinc-rich dusts, are recovered, advantageously with more than 20% of zinc.

According to still another feature of the invention, the method is characterized in that a bed of active coal either sulfurized or not as granules with a specific surface area from 300 to 1,500 m$^2$/g is used.

According to still another feature of the invention, the method is characterized in that for the upgrade of used or rejected battery cells, a cupola furnace is used.

According to still another feature of the invention, the method is characterized in that a free arc furnace or an induction furnace is used for the upgrade of the used or rejected battery cells.

The facility for carrying out the method is characterized in that it comprises an furnace for melting metal and a layout for treating fumes from the furnace in order to reduce the content of dusts, of mercury and of heavy molecules of the dioxin, furan and aromatic type in the fumes discharged into the atmosphere to values respectively less than 0.01 mg/Nm$^3$, 2 µg/Nm$^3$ and less than 0.1 µg/Nm$^3$.

According to a feature of the invention, the facility for applying the method is characterized in that the layout for the treatment of fumes comprises a gas treatment cartridge provided with a bed of active coal either sulfurized or not in granules for capturing mercury and heavy molecules of the dioxin, furan and aromatic type.

According to another feature of the invention, the facility for applying the method is characterized in that the layout for treating the fumes comprises filtering devices for reducing the concentration of dusts in the fumes to a value of less than 0.5 mg/Nm$^3$ at the inlet of the bed of active coal.

According to still another feature of the invention, the facility for applying the method is characterized in that the cartridge comprises upstream from the active coal bed, a device for lowering the temperature of the fumes to be passed through the coal bed to a value of less than 60° C.

According to still another feature of the invention, the facility for applying the method is characterized in that the device for lowering the temperature is a heat exchanger.

According to still another feature of the invention, the facility for applying the method is characterized in that the melting furnace is a cupola furnace for producing cast iron.

According to still another feature of the invention, the facility for applying the method is characterized in that the melting furnace is an arc furnace or an induction furnace for producing cast iron.

BRIEF DESCRIPTION OF DRAWING FIGURES

The invention will be better understood, and other objects, features, details and advantages thereof will become more clearly apparent in the explanatory description which follows given with reference to the appended schematic figures only given as a example, illustrating several embodiments of the invention.

DETAILED DESCRIPTION

As a non-exclusive example, first of all the upgrading method for electric battery cells, notably portable alkaline and saline battery cells, either used or rejected, i.e. of the materials contained in these battery cells, will be described hereafter, which involves the use of a melting furnace for producing cast iron such as lamellar cast iron or spheroidal graphite, of the cupola furnace type with hot or cold air stream. But the invention may also be applied to other types of melting furnaces, in the production of cast iron, such as induction furnaces or free arc furnaces, with the purpose of upgrading the elements contained in the electric battery cells.

Figure 1:
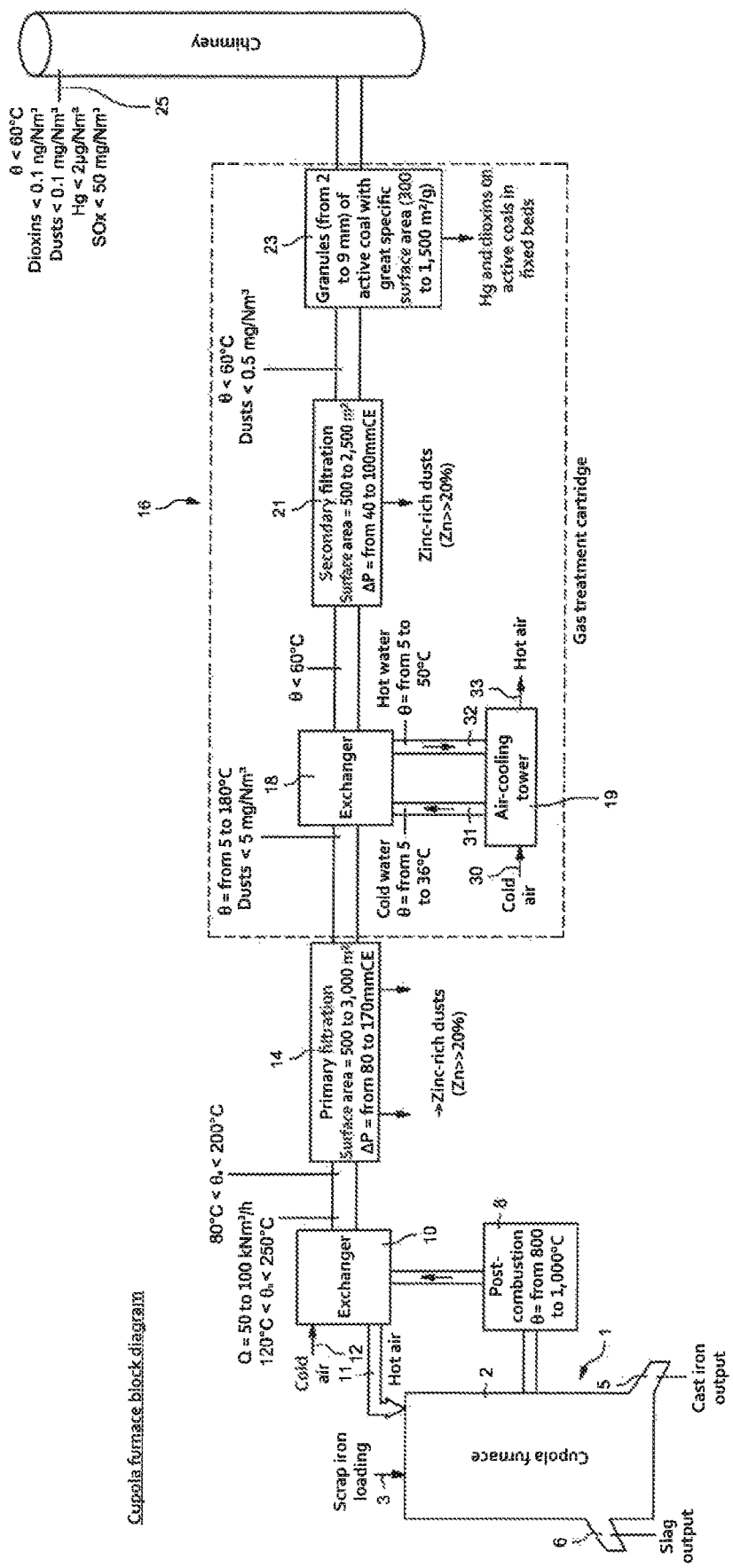
FIG. 1 shows the block diagram of a first embodiment of the invention using a cupola furnace for producing cast iron.

As schematically shown by FIG. 1, a cupola furnace designated by reference 1 comprises a barrel of the general cylindrical shape 2, at the top of which, i.e. on the topside 3, the metal loads containing scrap iron, recovery cast iron, coke, ferroalloys, fluxes, dosed and weighed beforehand by means of dosing hoppers not shown are emptied. At the foot of the cupola furnace, in 5 is seen the outflow of the metal fraction as liquid cast iron and in 6, above the outflow of liquid cast iron, is seen an outlet through which the mineral fraction is extracted as slag which contains the mineral impurities of the load and its liquefied fluxes and which stays afloat above the cast iron.

To the cupola furnace 1 are added a post-combustion device 8 which produces hot fumes by combustion of carbon monoxide itself stemming from the chemical reaction between carbon dioxide and the coke in the barrel of the cupola furnace, and a heat exchanger 10 which sends hot air in 11 into the cupola furnace, obtained by heating the cold air introduced into the exchanger in 12. The air is heated up by the hot fumes from the post-combustion device 8. The hot fumes leaving the exchanger 10 cross a primary filtration station 14 in order to reach a gas treatment cartridge 16 which is an essential characteristic of the invention and will be described further on in detail.

As regards the used battery cells which the invention proposes to upgrade, they contain as upgradable metals, notably iron Fe for example in an amount from 15-25%, zinc Zn in an amount of 15-30%, manganese Mn in an amount from 12-30%, carbon C fixed and organic in an amount from 15-32%, a few percentages of copper Cu, of nickel Ni, of potassium K and the remainder in electrolyte including water.

According to the invention, in its application to cupola furnaces, the amount of used battery cells loaded into the cupola furnace is based on the required manganese content for the cast iron at the outlet of the furnace. Generally, most cast irons produced by cupola furnaces contain between 0.5% and 1% of manganese and up to 10% for special cast iron grades.

Until now, this manganese is purchased, most of the time as a noble ferro-manganese material. Now, if the scrap iron which a foundry purchases for the loads has a manganese level of 0.3%, it is therefore necessary to add 0.4% of manganese for example in order to manufacture a cast iron with 0.7% of manganese.

In the case of the invention, this purchased manganese is totally replaced by the manganese provided by the used battery cells. The other upgradable components, i.e. iron Fe, copper Cu, and carbon C contained in the battery cells and therefore introduced into the cupola furnace with the battery cells give the possibility of reducing however these components in the traditional loads not including any battery cells. The other metals contained in the battery cells as trace amounts such as nickel Ni, cobalt Co contribute to the quality of the cast iron as a pearlitization agent. In the case of zinc Zn, the latter is recovered in the dusts from filtration of the fumes, mainly carried out at the primary filtration device 14. The zinc concentration contained in the dusts then passes via the treatment of battery cells, from a concentration of a few percent to several tens of percents allowing a much more economical upgrade of these dusts notably as compared as putting them in a landfill. In the case of potassium K, the latter is advantageously recovered for one part to the slag by lowering its melting point and therefore saving energy and on the other hand in the dusts of the primary filter as potassium chloride, as an agent for capturing and neutralizing chlorine. It is important to emphasize that the potassium fraction contained in the dusts also will give the possibility of saving energy by lowering their melting point during their recycling notably in the Waelz method which is dedicated to producing zinc oxides.

At the primary filtration outflow, the processed gases containing trace amounts of volatile heavy metals such as mercury Hg or even of heavy organic molecules of the dioxin or aromatic type are treated by the treatment cartridge 16.

The gas treatment cartridge 16 positioned upstream from the primary filtration device 14 comprises in the direction of flow of the fumes, successively, a heat exchanger 18 connected to an air-cooled tower 19 (or any other equivalent cooling device), a secondary filtration device 21 and a bed of either sulfurized or not active coals 23. The perfectly clean fumes leaving the bed 21 are discharged into the atmosphere through the chimney 25.

In the system according to the invention, the hot fumes leaving the melting furnace and/or the post-combustion system have a temperature comprised between 800° C. and 1,000° C. At the outlet of the heat exchanger 10, the fumes have a flow rate from 50 to 100 $kNm^3/h$ (in the mentioned example) and a temperature comprised between 120° C. and 250° C. At the inlet of the primary filtration device 14, this temperature is from 80° C. to 200° C. The primary filtration device includes as an example a surface area equal to 500 to 3,000 $m^2$ and operates with a pressure difference Δp between the dirty air and purified air box which is equal to 80 to 200 mmCE. The dusts flowing out symbolized by arrows are rich in zinc, the content of which is considerably greater than 20% and for a draw of flow rate of more than 50 kg/h.

In the treatment cartridge 16, at the inlet of the exchanger 18, the temperature of the fumes is comprised between 50 and 180° C. and the concentration of dusts is less than 5 $mg/Nm^3$. The cold water which is sent to the exchanger 18 through the air-cooling tower 19 in 31 at a temperature ranging from 5 to 36° C. and the temperature of the hot water sent back through the exchanger to the tower 19 is of the order of 5 to 50° C. The air-cooling tower receives the cold air in 30 and discharges the hot air in 32. The temperature of the fumes between the heat exchanger 18 and the secondary filtration device is less than 65° C. The filtration device has a surface area from 500 to 2,500 $m^2$ and the pressure difference between the dirty air and clean air box Δp ranges from 40 to 100 mmCE. The dusts which flow out in 34 are rich in zinc. The zinc content is much greater than 20% and for a draw of flow rate of a few hundred grams per hour.

Between the secondary filtration device 21 and the bed of active coal 23, the temperature of the fumes has to be less than 60° C. and the amount of dusts present in the fumes should be less than 0.5 $mg/Nm^3$. As regards the bed of active coal 23, it includes granules with a length from 2 to 9 mm for a diameter from 1 to 3 mm with a grade specific surface area from 100 to 1,500 $m^2/g$. This bed of active coal binds the mercury Hg and the heavy molecules such as dioxins, furans and aromatic substances. The fumes which flow out through the chimney 25 have a temperature of less than 60° C., a dioxin content of less than 0.1 $ng/Nm^3$, a content of dusts of less than 0.1 $mg/Nm^3$, a mercury Hg content of less than 2 $mcg/Nm^3$ and a content of $SO_x$ of less than 50 $mg/Nm^3$.

It emerges from the description which has just been made, that the invention is based on the total upgrade of the manganese contained in the battery cells. Thus, depending on the need for manganese in the cast iron grade to be produced, the total amount of manganese to be loaded into the cupola furnace is computed on the one hand, and, the manganese level contained in the load scrap iron, a level which is less than that of the targeted grade on the other hand. The difference between the total amount of manganese required and the amount of manganese contained in the load scrap iron is computed. This difference forms the correction difference in manganese which has to be added. And then from this difference, the amount of battery cells to be put into loads is computed, depending on the specific manganese content of the battery cells. On this subject, knowing that a grade always gives a minimum and/or maximum composition range, the battery cells individually have a manganese content from 12 to 30% by weight, the average rather emerges towards 20 to 22%. These ranges take into account that this average changes overtime with the technologies of the battery cell producers, their country at the origin of the production and the delay for returning to recycling of the product at the end of its lifetime.

As regards the other materials of the loads, the amounts of these materials which are contained in the battery cells are also taken into account.

For example, in the production of cast iron, carbon of the anthracite type or coke has to be loaded, typically of the order of 100 to 200 kg/T as compared with the metal loads, on the one hand for carbonizing the metal and on the other hand for producing the energy required for melting. For the load of carbon, the fixed and volatile carbon contained in the battery cells is taken into account for adjusting the loaded carbon level, whether it is in the form of anthracite or coke.

Hereafter a computation and operating mode example according to the invention will be given. Of course, this is a non-exclusive example. A cast iron foundry intends to produce a grade with a manganese level of a minimum of 0.7%. The scrap iron which it purchases for the loads has a manganese level of 0.3%. Thus, a correction has to be made and therefore addition of a minimum of 0.4% of manganese in order to obtain the targeted grade, i.e. 4 kg of manganese per ton of loaded metal material.

The amount of battery cells equivalent to 4 kg of manganese is computed, i.e., depending on the minimum content of 20% of the mass average, an amount of 20 kg of battery cells to be loaded with one ton of scrap iron.

As regards carbon, for a load computation which gives need for 150 kg of carbon/ton T of scrap iron, being aware that by mass the battery cells contain 15 to 32% of carbon, while the 20 kg of battery cells will provide about 4 kg of carbon, an amount to be deducted from the 150 kg. The operators or the loading robots for the carbon will have to modify their instructions from 150 kg to 146 kg/ton of loaded scrap iron.

The battery cells include components which are particularly dangerous, like mercury even if it is present in a small amount. Moreover, other compounds present in battery cells of the $ZnCl_2$, KCl, tar, powdered carbon, metal compounds in a finely divided form such as manganese oxides or hydroxides, prove to be powerful catalysts for forming dioxins, or even APH (aromatic polycyclic hydrocarbons) during a gradual rise in temperature during the melting process.

It is the presence of these compounds or chemical compositions, which require the presence of the gas treatment device 16 which is a sophisticated and performing purification device.

In the following the operation of the facility according to the invention and the sequence of steps of the method will be described.

In the system with a cupola furnace with hot or cold air stream according to the invention, the hot fumes are channeled by a topside or side capture device on the cupola furnace. The fumes are conveyed through sealed piping with natural and/or forced cooling, for example by means of the exchanger 12 of the single figure. A first filtration is carried out in the primary filtration device 14 in order to have the dust level contained at the outlet of the primary filter to less than 5 $mg/Nm^3$ typically to a temperature from 60 to 200° C. After the treatment of the fumes in the primary filter 14, they are cooled to a temperature of less than 60° C. by the exchanger 18 in a closed circuit, especially without any injection of water any forms whatever (steam, droplets, etc.) this in order to contract the air vein. The fumes are again filtered on a second filter, i.e. the secondary filtration device 21 for having the level of contained dusts pass to less than 0.5 mg/Nm³. Next, the purification of the gases is ended by having them pass through the filter with a sulfurized active coal 23 which binds the mercury and the heavy molecules of the dioxin, furan and aromatic type on the active coal. At the saturation of the bed of active coal measured by its inlet-outlet pressure drop, the latter is drawn off so as to be then de-polluted and regenerated so as to be reused in the same application.

It should be noted that the purification of the gases in the secondary filter is imperative, as regards the dusts, in order to avoid fouling of the porosities of the active coals and preserving their lifetime. This lifetime would be of 2 to 6 months without any secondary filter, but will be of several years by means of a secondary filter.

The temperature of the gases at the inlet of the filter with active coal should not exceed 60° C. By default, on the one hand, the active coals risk self-heating with runaway of reactions until possible complete destruction of the filter, and, on the other hand, the efficiency of the captures of mercury, because of its very low concentration, and of the heavy molecules require this low gas temperature.

With these gas treatment devices, atmospheric discharges then have the following very low values already indicated above: for mercury, less than a few micrograms/Nm³, for dioxins from 10 to 1,000 times less than the standard of 0.1 ng/Nm³ and for the dusts, much less than 0.01 mg/Nm³.

Thus, the invention not only allows the upgrade of used or rejected battery cells but also ensures a quasi-complete purification of the processed gases.

The invention does not resort to any particular structure in terms of operating personnel on the already existing site on the one hand and, on the other hand, is substituted for already consumed materials and transformed in its direct operating cost.

The invention ensures a significant cost reduction for the foundry. Indeed, the substitution of many raw materials of loads (Fe, C, Mn, Cu) and the zinc Zn enrichment of the dusts making them upgradable generates significant savings of the compounds as follows, per ton of consumed battery cells at the present prices of the materials at the date of the filing of the patent:

Manganese: approximately 200 kg at 1 euros/kg, i.e. 200 euros;

Iron: approximately 200 kg at 0.3 euros/kg, i.e. 60 euros;

Carbon: approximately 200 kg at 0.35 euros/kg, i.e. 70 euros;

Zinc: cost reduction upon discharging the melting dusts by Zn enrichment, i.e. 85 euros;

Copper: approximately 10 kg at 5.5 euros/kg, i.e. 55 euros.

Finally, stopping the injection of reagent into the primary filter, in the case when it exists, for capturing the dioxins, about 25 euros.

I.e. a total of production of value of the order of 450 to 500 euros/ton of battery cells from which the direct costs of the order of 80 to 100 euros/ton of battery cells has to be subtracted and therefore a net gain of the order of 370 to 400 euros/T of battery cells without write-off and maintenance of the proposed facility for treating gases and environmental animation commercial costs and of traceability of the upgrade branch.

The table which follows gives the balance of the upgraded materials by means of the invention.

| Chemical element contained in the battery cells | Level contained in the battery cells (%) | Valorization level of the invention (%) |
| --- | --- | --- |
| Fe | 10-25 | >99.5 |
| Mn | 12-27 | >99.5 |
| Zn | 12-25 | >95 |
| Organic and fixed C | 10-35 | Organic C: production of energy. 100% Fixed C: recarbidation. >80% |
| Cu | 0.5-1.5 | >99.5 |
| Ni | 0.1-0.7 | >99.5 |
| Sn | 0.02-0.03 | >99.5 |
| K and Cl | 3-10 | >80 |
| Hg | 2 ppm to 1000 ppm | >99.5 |

The invention has been described herein before, as an example, in an embodiment involving the use, as a furnace for melting metal, a cupola furnace for producing cast iron. However, the invention is not limited to a cupola furnace and the upgrading of used or rejected battery cells may also be accomplished by using other furnaces for melting cast iron such as a free arc furnace or an induction furnace as shown in FIGS. 2 and 3 provided that in the route for discharging the hot fumes, between the furnace and the chimney, are provided the primary filtration device 14 and the gas treatment cartridge 16 appearing in the upgrading system including the cupola furnace, according to FIG. 1.

It is important to note that the level of upgrading of the materials of used or rejected electric battery cells, as described in the invention is exceptionally high and much greater than the one dictated in the European directive 2006/66 CE.

Figure 2:
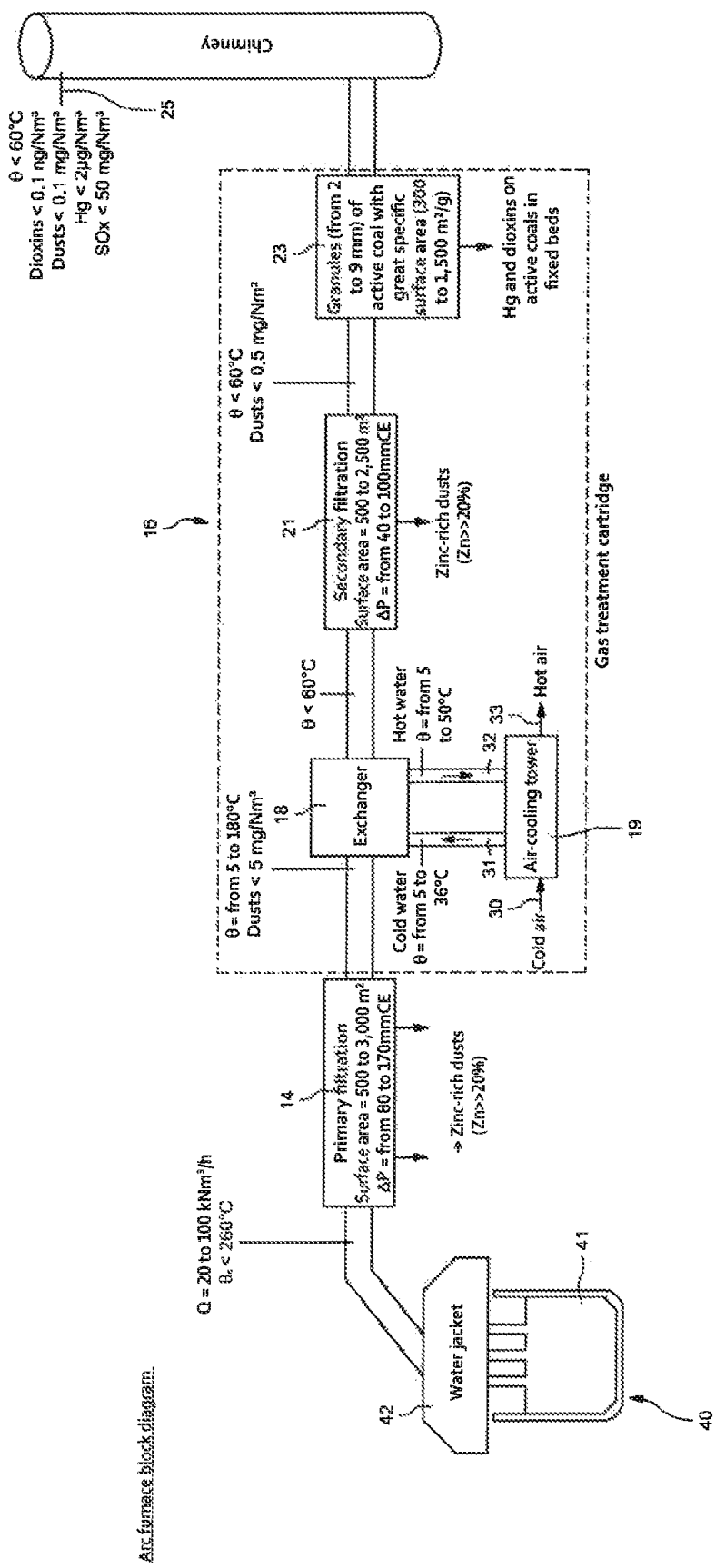
FIG. 2 shows the block diagram of a second embodiment of the invention using a free arc furnace in the production of cast iron.

FIG. 2 shows the block diagram of the system with an arc furnace. This furnace with a configuration known per se is designated by reference 40. The numbers 41 and 42 designate the liquid contained in the laboratory of the arc furnace and the piping for extracting hot gases directly from the furnace itself cooled with water. The hot gases flowing out of the arc furnace, upstream from the primary filtration device 14 have, in the illustrated example, a flow rate comprised between 20 and 100 kNm³/h and a temperature of less than 260° C. The hot gases are then treated and purified by passing through the primary filtration device 14 and the gas treatment cartridge 16, used within the scope of the use of the cupola furnace of FIG. 1.

Figure 3:
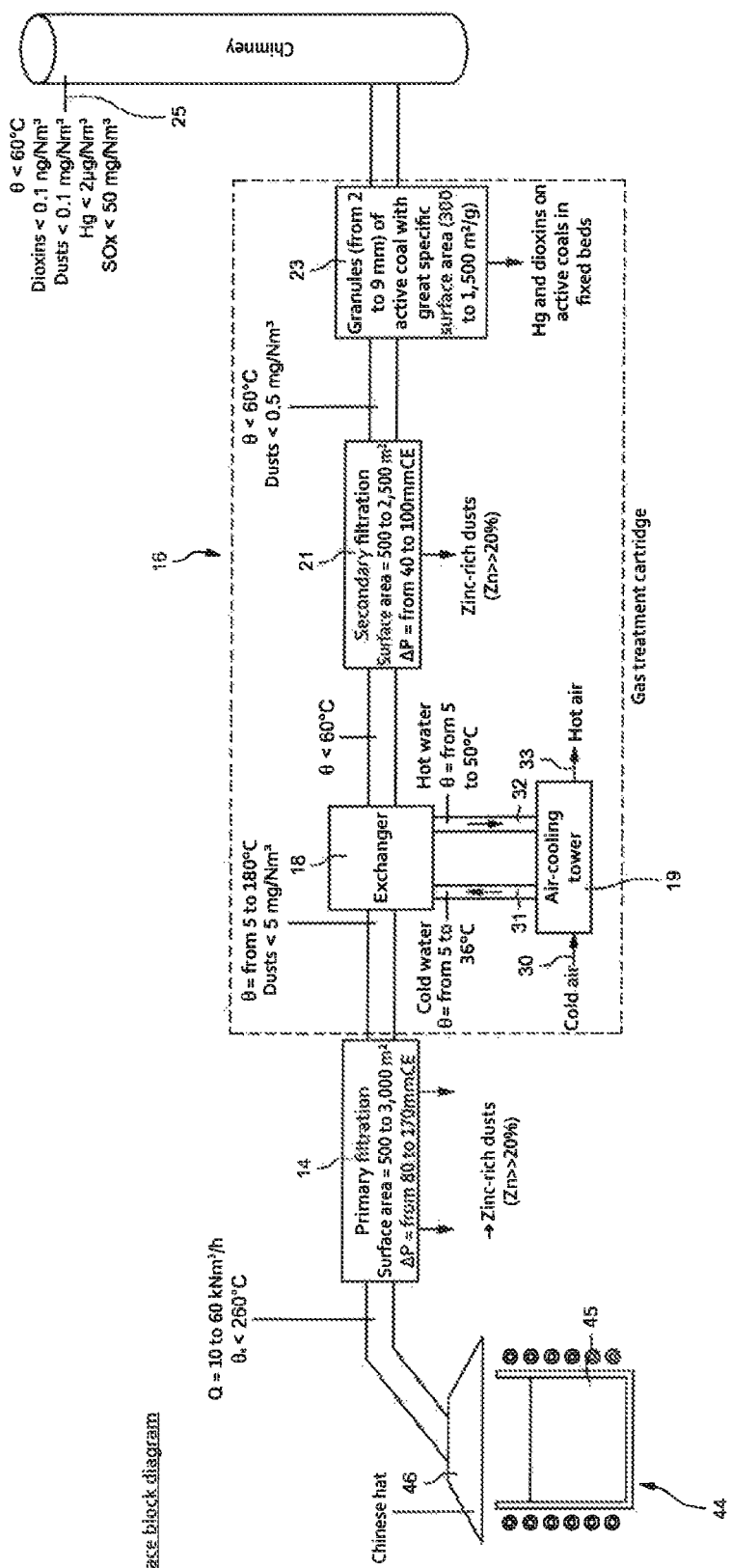
FIG. 3 shows a third embodiment of the invention using an induction furnace in the production of cast iron.

FIG. 3 gives the block diagram of an induction furnace with which are associated, for the application of the method for upgrading used or rejected battery cells, the primary filtration device 14 and the treatment cartridge 16. In FIG. 3, the induction furnace is designated by the general reference 44, the reference numbers 45 and 46 designating the liquid and the Chinese hat. The hot vapors leaving the induction furnace upstream from the primary filtration device 14 have a flow rate from 10 to 60 kNm³/h and a temperature of less than 260° C.

The upgrading of the used or rejected battery cells in arc furnaces or in induction furnaces for producing cast iron according to the provisions of the invention is made possible by means of the filtration device and of the gas treatment cartridge, which give the possibility of removing the noxious elements such as mercury and heavy molecules such as dioxins, furans and aromatics before discharge of the fumes into the atmosphere via the chimney 25.

The invention claimed is:

1. A method for upgrading used or rejected electrical battery cells selected from the group consisting of saline, alkaline and button battery cells, which include upgradable components including iron, zinc, manganese and copper, comprising introducing the used or rejected battery cells as a load into a furnace for melting metal, which is one of a cupola furnace, a free arc furnace and an induction furnace, together with manganese-containing scrap iron, carbon and other load components, capturing and removing noxious elements including mercury, zinc, and heavy molecules including dioxins and aromatic substances in a gas purification device through which gases are discharged from the furnace, producing a cast iron having a predetermined content of manganese by selecting a quantity of the used or rejected batteries introduced in the furnace so that the manganese content in the produced cast iron corresponds to an amount of manganese included in the introduced used or rejected battery cells and the manganese contained in the scrap iron.

2. The method according to claim 1 including subjecting fumes flowing out of the melting furnace to filtration for reducing concentration of dusts contained in the fumes to less than 0.5 µg/Nm$^3$ and passing the fumes through a sulfurized or not active coal bed for binding the mercury and heavy molecules so that fumes discharged into an atmosphere have a mercury content of less than 2 µg/Nm$^3$ and dioxins of less than 0.1 ng/Nm$^3$.

3. The method according to claim 2, including during filtration of the dusts recovering more than 20% of the quantity of the zinc contained in the outflowing fumes.

4. The method according to claim 2 wherein either a sulfurized or not active coal bed is used with a specific surface area in a range from 300 to 1,500 m2/g.

5. The method according to claim 1 including using a cupola furnace for the upgrading of used or rejected battery cells.

6. The method according to claim 1 using a free arc furnace or an induction furnace for the upgrading of used or rejected battery cell.

7. A method for producing manganese-containing cast iron in a melting furnace which is one of a cupola furnace, a free arc furnace and an induction furnace for producing metal, comprising introducing manganese-containing scrap iron and other load components in said melting furnace together with a predetermined amount of additional manganese, wherein the amount of additional manganese is the manganese which is contained in used or rejected electrical battery cells including upgradable components comprising iron, zinc, manganese, and copper and wherein a quantity of used or rejected battery cells is selected so that the amount of manganese which is contained in said used or rejected battery cells corresponds to the amount of additional manganese.

8. A method for upgrading used or rejected electrical battery cells selected from the group including saline, alkaline and button battery cells, which comprise upgradable components including iron, zinc, manganese and copper, comprising introducing the used or rejected battery cells as a load into a furnace for melting metal, which is one of a cupola furnace, a free arc furnace and an induction furnace, together with manganese containing scrap iron, carbon and other load components, capturing and removing noxious elements including mercury, zinc, chlorides and fluorides, dioxines, and aromatic substances in a gas purification device through which gases are discharged from the furnace, and introducing said battery cells as a load component together with an amount of carbon to recover all manganese contained in the battery cells and the scrap iron in the produced cast iron.

\* \* \* \* \*